US007011689B2

(12) United States Patent
Aleonard et al.

(10) Patent No.: US 7,011,689 B2
(45) Date of Patent: Mar. 14, 2006

(54) MELTED ALUMINA-ZIRCONIA CERAMIC GRAINS, ABRASIVE TOOLS AND REFRACTORY PARTS PRODUCED FROM SAID GRAINS

(75) Inventors: Bruno Pascal Albert Aleonard, Avignon (FR); Alain Paul Bernard Zanoli, Avignon (FR)

(73) Assignee: Societe Europeenne des Produits Refractaires, Courbevoie (FR)

( * ) Notice: Subject to any disclaimer, the term of this patent is extended or adjusted under 35 U.S.C. 154(b) by 172 days.

(21) Appl. No.: 10/457,357

(22) Filed: Jun. 10, 2003

(65) Prior Publication Data

US 2004/0040218 A1   Mar. 4, 2004

Related U.S. Application Data

(63) Continuation-in-part of application No. 09/857,800, filed as application No. PCT/FR99/03057 on Dec. 8, 1999, now abandoned.

(30) Foreign Application Priority Data

Dec. 9, 1998 (FR) .................................. 98 15527

(51) Int. Cl.
*B24D 18/00* (2006.01)
*C09K 3/14* (2006.01)

(52) U.S. Cl. ............................ 51/307; 51/308; 51/309; 264/5; 264/319; 264/332; 264/430; 264/460; 264/405

(58) Field of Classification Search ................ 51/307, 51/308, 309; 501/102, 103, 104, 105, 108, 501/127, 128; 264/5, 319, 332, 430, 460, 264/405

See application file for complete search history.

(56) References Cited

U.S. PATENT DOCUMENTS

| 3,181,939 A | 5/1965 | Marshall et al. |
| 3,607,162 A | 9/1971 | Bockstiegel et al. |
| 3,881,282 A | 5/1975 | Watson |
| 3,891,408 A | 6/1975 | Rowse et al. |
| 3,893,826 A | 7/1975 | Quinan et al. |
| 4,035,162 A | 7/1977 | Brothers et al. |
| 4,126,429 A | 11/1978 | Watson |
| 4,457,767 A | 7/1984 | Poon et al. |
| 4,595,663 A | 6/1986 | Krohn et al. |
| 5,403,794 A | 4/1995 | Morris et al. |

FOREIGN PATENT DOCUMENTS

| DE | 2 246 705 | 3/1974 |
| EP | 480678 A2 | 4/1992 |
| GB | 2 090 275 | 7/1982 |

*Primary Examiner*—Michael Marcheschi
(74) *Attorney, Agent, or Firm*—Young & Thompson

(57) ABSTRACT

A process for producing fused alumina-zirconia grits includes mixing raw materials suitable to produce grits with the following chemical composition, in % by weight: $ZrO_2$+$HfO_2$: 10–60%, $Al_2O_3$: 38–90%, $SiO_2$: <0.8%, and Impurities: <1.2%. The process also includes adding carbon and aluminum metal to the mixture of raw materials to obtain a charged batch containing, in % by weight,: Carbon: 0.4–1% Aluminum metal: 0.5–2.5%. The process further includes melting the charged batch in an electric arc furnace with a voltage of 175–205 V and a delivered specific electrical energy of 2.5 to 4 kWh per kg of charge.

19 Claims, No Drawings

MELTED ALUMINA-ZIRCONIA CERAMIC GRAINS, ABRASIVE TOOLS AND REFRACTORY PARTS PRODUCED FROM SAID GRAINS

This application is a CIP of Ser. No. 09/857,800 filed Jun. 11, 2001, now abandoned which is a 371 of PCT/FR99/03057, filed Dec. 8, 1999.

FIELD OF THE INVENTION

The present invention relates to a novel fused ceramic grit consisting essentially of alumina and zirconia, not greatly reduced (in the oxidation-reduction sense) but remaining dense and retaining good mechanical properties. The excellent mechanical strength and thermal resistance of the grit of the invention makes it particularly well suited for abrasive applications, especially in grinding wheels with a vitreous binder, as well as for refractory applications in which good oxidation resistance is desired.

BACKGROUND OF THE INVENTION

Abrasive tools are generally classed according to the way in which the ceramic grits of which they are composed are formed: free abrasives (use in spraying or in suspension, without a support), coated abrasives (with a support of the cloth or paper type, in which the grits are located on several layers) and bonded abrasives (in form of circular grinding wheels, of sticks, etc.). In the latter case, the abrasive grits are pressed with an organic or vitreous binder (for example, a binder consisting of oxides, essentially silicates). These grits must themselves have good mechanical abrasion properties (especially toughness) and give rise to good mechanical cohesion with the binder (interfacial strength). At the present time, there are commercially available various families of abrasive grits making it possible to cover a wide range of applications and of performance: oxide grits synthesized by fusion (called fused grits here) in particular offer an excellent quality/manufacturing cost compromise.

Within the fused grit range, materials based on alumina and zirconia are known from U.S. Pat. No. 3,181,939. These grits are generally composed, by weight, of 10 to 60% of zirconia and 0 to 10% of an additive, the balance being alumina. In practice, the zirconia content of the commercial products lies either around 25% or around 35 to 50%, that is to say around the composition of the alumina-zirconia eutectic located at about 42% zirconia, as described in U.S. Pat. No. 3,891,408. The latter reference indicates that the products around the eutectic offer better abrasive performance than alumina grits, especially if they have been very rapidly solidified so that most of the structure is composed of eutectic colonies and that, in the eutectic colonies, the interlemellar or interfiber spaces are less than 4000 Å, the eutectic colonies being oriented perpendicular to the solidification front. This type of unique structure provides, for abrasive applications, an excellent balance between mechanical strength, required for maximum use of the grit, and microfracturing during use, necessary for good regeneration of the cutting surfaces. Moreover, it is known that it is preferable to use products in which the zirconia is present in its tetragonal (or even cubic) allotropic form and not in its monoclinic form. Stabilizers, such as yttrium oxide added in an amount up to 2% according to U.S. Pat. No. 4,457,767 for titanium oxide added in an amount up to 10% according to DE-C-4 306 966, are also known to improve the abrasive power of the alumina-zirconia grits. Magnesium oxide has also been mentioned as a possible additive, but above a content of a few percentage points, its presence leads to the formation of a spinel with alumina until disappearance of the corundum, and hence a lower mechanical performance.

Alumina-zirconia grits are also the grits of choice for refractory applications, particularly for the manufacturer of nozzles or slide gate valve plates employed in the continuous casting of steel. The grits are incorporated in matrices often containing carbon ("black" products) but also in oxide matrices ("white" products and frits), especially alumina matrices. For refractory applications, resistance to the heat treatment is essential, whether during the forming of the components, or in service. Consequently, apart from the requirement of having low thermal expansion coefficients (so as to minimize the stresses on the matrix), the grit must have, after calcining, mechanical properties sufficient for itself not to result in the destruction of the component. These requirements very advantageously position the alumina-zirconia grits containing, as in the case of abrasive applications, around 25 or 42% zirconia. In particular, compositions containing 42% zirconia have good mechanical strength, a low thermal expansion coefficient and good corrosion resistance. The latter is improved in products based on dense and crack-free grits. This is because pores and cracks in this application form regions where molten liquids preferably penetrate and hence preferred sites of corrosion. Of course, the good mechanical strength of the material also requires a low content of defects, such as pores or cracks. For this purpose, in order to avoid volume changes and the associated cracks, which are induced by the transformation at temperature of monoclinic zirconia, the zirconia may be stabilized by the addition of dopants, such as titanium oxide or yttrium oxide, possibly combined with quenching of the product, which favors stabilization of the zirconia in the tetragonal, or even cubic, form.

From the process standpoint, the material is produced by fusing the raw materials of variable purity under reducing conditions, especially by the addition of a source of carbon (petroleum coke, pitch or coal) in the furnace. It is preferred in general to cool the material rapidly in order to favor the formation of fine and oriented structures using equipment, such as that described in U.S. Pat. No. 3,993,119, for casting between thin metal plates. Finally, the material produced is milled, for example in roll mills, and then screened and classified into series of grit size distributions meeting precise specifications (for example FEPA).

Producing the material under reducing conditions helps to reduce the impurity content of the cast product and makes it possible to obtain a dense material having good mechanical properties. Further beneficial effects may be mentioned, especially with regard to stabilization of tetragonal zirconia (see DE-C-4 306 966). In any event, the grades preferred for applications (organic wheels, "black" refractories or coated abrasives) in the prior art are always reduced and consequently contain carbon, sub-oxides and/or metallic or carbide species. U.S. Pat. No. 3,891,408 clearly indicates that the least reduced products [containing less than 0.5% (5000 ppm) carbon] exhibit lower abrasion performance. U.S. Pat. No. 5,143,522 mentions products containing from 300 to 5000 ppm carbon (examples according to the invention) and 100 or 200 ppm (comparative examples of lower performance). These high contents indicate the reduced state of the grits: they guarantee good performance, whether in coated abrasives or in wheels with organic binder.

However, the use of these reduced alumina-zirconia grits for producing wheels with a vitreous mineral binder has not been successful because of an incompatibility between these grits and the vitreous binders typically used in bonded abrasives and, to the Applicant's knowledge, no article of this kind exists on the market. The wheels with a vitreous mineral binder commercially available at the present time are produced from fused or sintered corundum grits.

From the studies carried out by the Applicant, the incompatibility between the grits and the vitreous binder is due to the highly reduced state of these grits. This is because we have found that a ceramic grit which is reduced too much reacts during firing of the vitrified wheels, releasing bubbles into the binder, which significantly reduces the mechanical properties of the wheel. A highly reduced grit even leads to a large volume expansion of the wheel, which is immediately perceptible to the eye. Without wishing to be tied to any particular theory, we believe that the contact in an oxidizing atmosphere at high temperature (above 900° C. for several hours) of a sub-oxidized product based on alumina and zirconia with a number of oxides of lower stability (such as silicate binders) naturally gives rise to redox reactions, these being accompanied by the evolution of gases and/or large expansions which weaken the grit and its interface with the binder of the wheel. Similarly, for refractory applications, the resistance to grit reoxidation is a particularly important aspect, both in production (in the case of "white" refractories) and during use (oxidation by slag in the case of all steelmaking refractories). Reduced grits are not suitable for uses as white products, these being, in fact, the seat of multiple fracturing and volume expansions unacceptable during use of the components. More generally, for all steelmaking refractories, reduced grits are inconducive to resistance to oxidation by slag.

To overcome these problems, we have considered producing fused alumina-zirconia grits which are less reduced.

A first approach consisted in subjecting "conventional" (reduced) materials to a heat treatment in an oxidizing atmosphere once they have solidified. However, we have observed that this results in a drop in the performance of said grits to a point at which there is no longer any benefit of the alumina-zirconia material; this is because the mechanical tests show (see the examples) that the conventional grits thus treated have a lower performance than that of the fused corundum control products. This confirms the discrete tests detailed in U.S. Pat. No. 3,891,408 or DE-C-4306966 which indeed indicate a drop in performance due to a heat treatment.

A second approach has consisted in oxidizing the melt pool before casting, using known techniques such as that of controlling the fusion energy in the case of furnaces open to the air (the product obtained will be more oxidized the greater the amount of energy supplied during fusion), of adjusting the length of the arcs, of injecting oxidizing gases, etc. However, we have found that such production conditions generally result in porous materials, which lowers the mechanical performance of these materials.

As a variant, the molten liquid may be oxidized upon solidification, especially by air dispersion. However, reoxidation of a reduced liquid produces blisters (porosity) at the surface in contact with the ambient air during solidification, whether on granulates obtained by air dispersion or at the upper surface of the casting molds.

Finally, it may be noted that, in order to alleviate the problem of porosity, another possible solution would be to add a few percent of silica to the composition. Thus, it appears that a silicate phase helps to reduce porosity. However, the presence of silica is deleterious to the mechanical properties of the grits. U.S. Pat. No. 3,891,408 and U.S. Pat. No. 5,143,522 indicate, moreover, that appreciable amounts of $SiO_2$ (1% maximum in the case of these two patents) or of $Na_2O$ (0.1% maximum) should be avoided.

The abovementioned approaches are the simplest to implement but, unfortunately, the products which stem therefrom do not have the required characteristics.

SUMMARY OF THE INVENTION

Surprisingly, we have found that fused alumina-zirconia grits having better properties may be obtained by an appropriate and fine control of the fusion production conditions.

This is because we have observed that there is an oxidation-reduction state range in which the fused alumina-zirconia grits which are dense and only slightly reduced, with good mechanical properties, can be obtained. In addition, it is found that the grits of the invention have a tetragonal zirconia content close to that of the "conventional" reduced products.

Any grit size indicated hereafter is given a grit number in accordance with the FEPA "F" standard.

More particularly, the invention relates to fused alumina-zirconia grits having the following chemical composition, in % by weight:

| | |
|---|---|
| $ZrO_2 + HfO_2$: | 10–60%, preferably 35–50% and advantageously 38–45%; |
| $Al_2O_3$: | 38 to 90%, preferably 48–65% and advantageously 53–62%; |
| $SiO_2$: | <0.8% preferably <0.4%; |
| Impurities: | <1.2%, | which are characterized in that they are in a slightly reduced state such that said grits contain less than 100 ppm carbon, preferably less than 50 ppm carbon, and have:

a) a porosity, defined by the number of pores greater than 20 µm in size, of at most 6 for grits of F24 grit number (FEPA "F" standard), at most 2 for grits of F60 grit number and at most 1 for grits of F100 grit number;

b) a toughness, as defined below, of at least 2.5 $MPa.m^{1/2}$ after calcining at 900° C. in air for four hours. Note: The oxide contents given above relate in fact to the overall contents for each of the corresponding chemical elements, expressed in the form of the most stable oxide, according to the usual industrial convention; we therefore include sub-oxides and possibly nitrides, oxynitrides, carbides, oxycarbides, carbonitrides, or even metallic species of the abovementioned elements.

Preferably, the grits of the invention furthermore have an impact strength after calcining at 900° C. in air for four hours, as defined by the test defined in the description, of at least 40 for grits of F24 grit number, at least 50 for grits of F60 grit number and at least 60 for grits of F100 grit number.

Optionally, the grits of the invention may contain up to 10% by weight, preferably up to 3% by weight, of at least one additive, the proportion of this additive substituting part of the $Al_2O_3$.

Preferably, the grits of the invention have a grit number going from F12 to F120 according to the FEPA "F" standard.

Also preferably, the grits of the invention have a content of reduced species such that, in the acid etch test defined below, they give off less than 50 $cm^3$ of hydrogen per 100 g of grit, advantageously less than 25 $cm^3/100$ g.

Although the carbon content may theoretically be zero, it will in most cases be at least 10 ppm.

The term "additive" covers the additives normally used in alumina-zirconia products, especially zirconia stabilizers such as yttrium oxide, titanium oxide, magnesium oxide, calcium oxide and rare-earth oxides, for example neodymium, lanthanum, cerium, dysprosium and erbium oxides. The term also includes mixtures of these oxides. Yttrium oxide is a particularly preferred additive, preferably in a proportion of 0.3 to 2% by weight. With regard to titanium oxide and magnesium oxide, the preferred proportions are 1–3% and 1–2% by weight, respectively.

The term "impurities" is understood to mean any compound other than those already mentioned, in particular those forming part of the group of oxides, nitrides, oxynitrides, carbides, oxycarbides, carbonitrides of sodium and of other alkali metals, of iron and of vanadium, as well as said metals in metallic form. Hafnium oxide, naturally present in the zirconia sources with contents of less than 2% with respect to zirconia, is not regarded as an impurity. The zirconia contents expressed here, determined by X-ray fluorescence, includes the hafnium oxide content.

The low degree of reduction of the grits of the invention guarantees, as we have demonstrated, good compatibility with the vitreous mineral binders used for vitrified wheels and the oxide matrices used for refractory applications. The grits of the invention may possibly be used in any other application in which an oxidation-resistant alumina-zirconia material may be beneficial, more particularly any application in which the product is exposed to air at temperatures above 700° C. Owing to their denseness (by controlling the production) and their toughness, the grits of the invention have better impact strength properties than fused aluminous grits. This denseness and toughness therefore make them advantageous for the conventional applications of alumina-zirconia grits, namely wheels with an organic binder and coated abrasives, grit blasting/spraying, polishing with suspensions, and "black" refractories.

The invention also relates to abrasive tools consisting of abrasive grits bonded by a binder or deposited as a layer on a flexible support and retained by a binder, characterized in that at least some of the abrasive grits are in accordance with the invention. Examples of such tools are wheels, abrasive papers and abrasive cloths. The invention furthermore relates to refractory components made of alumina-zirconia grits incorporated in a matrix, characterized in that the alumina-zirconia grits are, at least in part, in accordance with the invention. Finally, the invention relates to the use of said refractory components in the continuous casting of steel, especially as slide gate valve plates.

DETAILED DESCRIPTION OF THE PREFERRED EMBODIMENTS

The examples which follow are given for the purpose of illustrating the invention, but are in no case limiting. For these examples, we have chosen to work with two types of grit, grit having a zirconia content of 35–50% by weight, called hereafter products containing about 42% zirconia (a value close to the eutectic value), and those having a zirconia content of less than 35% by weight, called hereafter products containing about 25% zirconia.

A process for producing fused alumina-zirconia grits according to the invention comprises mixing raw materials to produce grits having the following chemical composition, in % by weight:

$ZrO_2+HfO_2$: 10–60%, preferably 35 to 50% by weight and most preferably 38–45% by weight, $Al_2O_3$: 38–90%, preferably 48 to 65% by weight
$SiO_2$: 0.8%, preferably <0.4%
Impurities: <1.2%

The mixture of raw materials can produce grits containing up to 10% by weight of at least one of the following oxides: yttrium oxide, titanium oxide and magnesium oxide, in substitution to the $Al_2O_3$. Preferably, the mixture of raw materials can produce grits containing up to 3% by weight of the above oxides in substitution to the $Al_2O_3$. Most preferably, the mixture of raw materials is suitable to produce grits containing yttrium oxide in an amount from 0.3 to 2% by weight and/or titanium oxide in an amount from 1 to 3% by weight and/or magnesium oxide in an amount from 1 to 2% by weight.

Carbon and aluminum metal are then added to the mixture of raw materials to obtain a charged batch containing, in % by weight:

Carbon: 0.4–1%, preferably 0.7–0.9%
Aluminum metal: 0.5–2.5%, preferably 2.4–2.5%

The carbon is coke, pet coke, coal or a mixture of these materials. Although other sources of carbon may be used.

The charged batch is then melted in an electric are furnace having a voltage of 175–205 v and a delivered specific electrical energy of 2.5 to 4 Kwh per Kg of charge, preferably 2.7–3.3 Kwh per Kg of charge.

The grits may be quenched, an operation allowing the solidification of the whole melted liquid in less than 10 seconds, after the charge batch is melted.

The grits may also further be milled in calcined after quenching. The calcining temperature 1) between 800° C. and 1100° C. for 2 to 8 hours and is preferably operated at 850° C.–950° C. for 3–5 hours.

Preferably, the grits are screened and grits of grit numbers from F12 to F120 (FEPA "F" standard) are selected.

EXAMPLES 1–12

Products Containing About 42% Zirconia

We firstly studied alumina-zirconia grits without an additive so as to demonstrate the advantages offered by the invention, even then without the addition of a stabilizer. We then used stabilizers, in this case yttrium, titanium and magnesium oxides. The contents of these stabilizers (in the case of products containing about 42% zirconia) were respectively centered around 0.7%, 2.7% and 1.8%: the first two values are typical values of commercial (reduced) products regarded as preferred in U.S. Pat. No. 4,457,767 (high value in claim 2) and DE-C-4 306 966 (example 4), respectively, both guaranteeing high tetragonal zirconia contents; the magnesium content gives a good comprise between effective zirconia stabilization and the presence of an even smaller amount of spinel phase. In the case of compositions other than those containing about 42% zirconia, the stabilizer content was adjusted so as to be proportional to the overall zirconia content.

The products given in the examples were produced from the following batch materials: subcalcined Bayer alumina with a low sodium content (<0.3%), a CC10 zirconia-containing material having high zirconia+hafnium contents (>98%) available from the Applicant, petroleum coke and chips of aluminum metal. The additives were introduced as substances with a purity of greater than 96% into the corresponding oxide.

The chemical compositions of the products obtained are given in Table 1. The products were produced according to the operating methods described below:

in the case of the Examples 1, 2, 3 and 4: (called "reduced products"), manufacture was carried out according to the conventional method well known to those skilled in the art, namely mixing the batch materials and melting them in a single-phase electric arc furnace of the Heroult type with graphite electrodes, with a furnace tank 0.8 m in diameter, a voltage of 160–175 V (short arcs) and a delivered specific electrical energy of 2.0 to 2.6 kWh per kg of charge. At least 2% (up to 2.8% and more) of petroleum coke, depending on the state of the furnace, and about 2.5% of aluminum chips where introduced into the charged batch. Next, the molten liquid was quenched using the machine described in U.S. Pat. No. 3,993,119. As known in the art, "quenching" is an operation allowing the solidification of the whole melted liquid in less than 10 seconds. Next, the grits were milled and classified according to their grit size; grit sizes of between F24 and F100, that is to say grits having a median size of greater than 100 μm, were used. The grits characterized in these examples and the following ones all had a bulk density (in the undensified state) of typically between 1.9 and 2 in the case of F24 grit, between 1.75 and 1.85 in the case of F60 grit and between 1.7 and 1.8 in the case of F100 grit. This corresponds to grits which were crushed simply and without any forming treatment (crushing in a jaw crusher and then passing, in 2 to 3 passes, through a roll mill). This bulk density was determined by filling a container of known volume, avoiding any vibration, with the grits to be measured, allowing them to fall freely into the container. The mass of the grits in the container was determined. The bulk density is this mass divided by the equivalent mass of water having the volume of the container;

in the case of the Examples 5, 6, 7 and 8: (called "products of the invention"), the batch materials were mixed and then melted in an electric arc furnace of the same type as previously, with a voltage of 175–205 V (long arcs) that is, a voltage of 175–205 v produces the so-called "long arc," and a delivered specific electrical energy of about 2.7 to 3.3 kWh per kg of charge. That figure may be lower (down to 2 kWh per kg of charge) in the case of an industrial-sized tank, depending on the thermal conditions of the furnace. According to the preferred configuration, about 0.8% coke with about 2.5% aluminum metal were introduced into the charged batch. The amounts of reducing agents introduced also depends on the level of impurities (especially sodium and silicon oxides) of the lots of batch materials, and the melting energy to be applied may consequently be readjusted over a certain range. Next, the molten liquid was quenched in a metal mold, as indicated above. In practice, attempts were made to work within an oxidation-reduction regime such that the chips collected were dense (visual inspection, hydrostatic weighing to give the expected density) while remaining light in color (dark colors characteristic, except in the case of the addition of titanium oxide, of too high a level of reduction are to be avoided). Next, the grits were milled and classified according to their grit size:

in the case of the Examples 9, 10, 11 and 12 (called "porous products"), the products were obtained by melting the batch materials under more oxidizing conditions. The process was operated above 190 V with a specific melting energy of greater than 3 kWh per kg of charge. At most 0.8% of coke was introduced into the charge batch in the furnace, i.e. the minimum needed to ensure initial reduction of the impurities and especially of the sodium and silicon oxides. No aluminum was introduced. A possible option would be to oxidize by injecting gas into the melt pool, but this operation in no way reduces the amount of porosity formed. Next, the molten liquid is quenched as indicated previously. The grits were then milled and classified according to their grit size.

The grits obtained were characterized chemically apart from their carbon content, by X-ray fluorescence. The carbon content directly reflects (in parallel with the acid etch test) the oxidation-reduction state. It was measured by infrared absorption (LECO apparatus, CS300 model). To do this, the product, after magnetic separation, was milled in a carbon-free mill jar (for example made of fused alumina-zirconia-silica) until a powder passing through a 160 μm screen was obtained. In particular, care was taken to prevent any contact between the product and sources of carbon (the operator's hands, paper); the powder was transferred directly into the pot for analysis. Finally, the LECO analysis procedure was followed, by heating the powder to 1600–1650° C. in a stream of oxygen, with a flux and a combustion accelerator.

The acid etch test consists in assaying the gaseous hydrogen given off by hot-etching the product with a mixture of hydrochloric acid and hydrofluoric acid. Thus, the level of reoxidation of the sub-oxidized species (sub-oxides, down to metal) was measured.

To do this, after magnetic separation, the product was milled in a mill jar made of an oxidized material (for example, a fused alumina-zirconia-silica) until a powder passing through a 160 μm screen was obtained. 2 to 10 g of product were removed and placed in a polypropylene reactor about 100 cm$^3$ in volume. Next, 25 ml of the following acid mixture was added: (for one liter) 250 ml of 40% HF, 375 ml of 37% HCl and 375 ml of water. After closing the reactor, the etching was carried out at about 80° C. in a water bath for 15 minutes, stirring from time to time. After the reactor had cooled, a syringe was used to remove, through a septum, about 0.5 ml which was injected into a gas chromatograph with catharometer detection (using, for the separation column, a 5 Å molecular sieve and argon as carrier gas). The result is expressed as the volume of gas under standard conditions per 100 g of product.

All the chemical and oxidation-reduction analysis data is given in Table 1.

TABLE 1

| Example No. | 1* | 2* | 3* | 4* | 5 | 6 | 7 |
|---|---|---|---|---|---|---|---|
| ZrO$_2$ (wt %) | 39.6 | 41.9 | 38.8 | 39.5 | 38.8 | 41.4 | 40.6 |
| SiO$_2$ (wt %) | 0.12 | 0.16 | 0.19 | 0.24 | 0.19 | 0.19 | 0.22 |
| Na$_2$O (wt %) | 0.08 | 0.06 | <0.05 | 0.09 | 0.09 | 0.08 | <0.05 |
| Y$_2$O$_3$ (wt %) | / | 0.76 | / | / | / | 0.81 | / |
| TiO$_2$ (wt %) | / | / | 2.18 | / | / | / | 2.59 |
| MgO (wt %) | / | / | / | 1.85 | / | / | / |
| Al$_2$O$_3$ (wt %) | Bal. | Bal. | Bal. | Bal. | Bal. | Bal. | Bal. |
| Carbon (ppm) | 180 | 145 | 200 | 220 | 60 | 45 | 95 |
| H$_2$ (cm$^3$/100 g) | 82 | 48 | 73 | 60 | 30 | 21 | 44 |

| Example No. | 8 | 9* | 10* | 11* | 12* | Ref |
|---|---|---|---|---|---|---|
| ZrO$_2$ (wt %) | 40.6 | 42.1 | 41.2 | 41.2 | 41.7 | / |
| SiO$_2$ (wt %) | 0.29 | 0.15 | 0.21 | 0.28 | 0.36 | 0.10 |
| Na$_2$O (wt %) | 0.13 | 0.06 | 0.09 | 0.08 | 0.22 | <0.05 |
| Y$_2$O$_3$ (wt %) | / | / | 0.75 | / | / | / |
| TiO$_2$ (wt %) | / | / | / | 2.98 | / | 0.4 |
| MgO (wt %) | 1.90 | / | / | / | 1.66 | <0.05 |

TABLE 1-continued

| Al₂O₃ (wt %) | Bal. | Bal. | Bal. | Bal. | Bal. | Bal. |
|---|---|---|---|---|---|---|
| Carbon (ppm) | 50 | 40 | 20 | 30 | 45 | / |
| H₂ (cm³/100 g) | 26 | 16 | 14 | 14 | 7 | / |

*means an example outside the invention.
/ means that this oxide was not intentionally added, but the composition may contain ≦0.20% by weight of Y₂O₃ or TiO₂ and ≦0.06% by weight of MgO, coming from the batch materials used.

The control grit is a fused aluminous grit sold under the name 32A by Saint-Gobain Industrial Ceramics and recognized as a reference grit for vitrified wheel applications.

In order to characterize the mechanical properties of the grits used both by themselves and with a vitreous binder, we used three tests, A, B and C described below:

A) Determination of the Impact Strength:

The aim of the test was to determine the fraction of surviving grits of a given grit size cut after being stressed in a steel mill jar: the test provides a dynamic evaluation of the mechanical strength of the grits.

I—Preparation of the Grits for Testing:
 1—Screening of the Fraction to Be Tested:
 710/850 μm, to represent grit of F24 grit number;
 300/355 μm, to represent grit of F60 grit number;
 150/180 μm, to represent grit of F100 grit number.

This screening was carried out on a ROTAP-type vibrating screen—a standard screen in the industry.

2—Removal of iron from the specimen before the test by magnetic separation.
 3—Oven drying of the specimen at 150° C. for 15 minutes and cooling in a desiccator.

II—Equipment Used for the Test:
 1—An AUREC-type T100 rotating mill, widely used for milling powders for chemical analysis. It is mounted on suspensions (six springs) and a hollow cylindrical jar containing the grits and a sliding free pallet are set in motion. The grits are stressed only by the impact of the pallet.
 2—A mill jar made of steel (Z160 C 12 grade) having the following dimensions: height 18 mm and inside diameter 139 mm.
 3—A hollow cylindrical pallet (75 mm in diameter and 46 mm in height, with a wall thickness of 10 mm) made of Z200C12 grade steel, and weighing 889 g.

III—Impact Strength Test:
 1—Cleaning of the jar with compressed air.
 2—A 25-gram lot of product to be tested within the grit size cut in question was introduced between the wall and the pallet of the mill jar. The AUREC mill was rotated at its nominal speed (1400 rpm) for a period of 40 seconds. The powder and the grits were then removed from the mill jar using a paintbrush (No. 50) in order to analyze the grit size distribution. The product was then introduced into a series of 200 mm diameter screens. All the samples were left on the ROTAP screener for 12 minutes with the following screens, Ti:

| Grit | | Screens used (apertures in μm) | | | | | |
|---|---|---|---|---|---|---|---|
| No. | Cut tested | T1 | T2 | T3 | T4 | T5 | T6 |
| F24 | 710/850 μm | 710 | 600 | 425 | 250 | 106 | 40 |
| F60 | 300/355 μm | 300 | 250 | 125 | 75 | 40 | |
| F100 | 150/180 μm | 150 | 125 | 75 | 40 | | |

IV—Measurement of the Impact Strength:

The impact strength value is given by the sum of the oversizes of the first two screens (710 μm+600 μm, for example in the case of the 710/850 μm cut). This value is expressed as a percentage of the initial mass introduced into the mill jar. The total of the T1+T2 oversizes indicates the strength of the material.

B) Determination of the Toughness by Indentation, Using Standard Procedures for Oxides:

I—A coating operation is carried out on the grits (preferably grit of F24 grit number in order to prevent grit/coating slippage effects; however, the toughness is in fact an intrinsic local value, independent of the grit number chosen). Black EPOMET epoxy resin, ref. No. 203 380 064, sold by Buehler, was used for the coating.
 II—The indentation was carried out (randomly in the structure, at most 60 μm from the edge of the coated grits and each time on a different grit particle) using a Vickers diamond with a load of 500 g, at a rate of 0.5 μm/s.
 III—The length of the cracks obtained (sharp radial cracks from the four corners of the indentation cavity) was measured; a very brittle material, having a toughness significantly less than 2.5 MPa.m$^{1/2}$, gives rise, with the loads in question, to catastrophic multiple cracking or spalling at the indentation edge, thereby preventing a rigorous calculation of toughness. When estimating the toughness, only indentation with a straight edge (no spalling), the corners of which form the point of initiation of single cracks without any multiple cracking or cracks looped between two indentation edges (spalling), were taken into account. A specimen giving rise to five correct indentations (out of a maximum of 15 tests) was used to calculate the toughness (average of five values); otherwise, the specimen was considered to give rise to catastrophic multiple cracking. Indentations obviously spoilt owing to a handling error (especially a lack of polishing flatness) were disregarded in the number of tests.
 IV—The toughness of the material is given by the following conventional formula, due to Liang:

$$K_{IC} = 0.5173 \left(\frac{Ha^{1/2}}{alpha}\right)\left(\frac{E}{H}\right)^{0.4} (c/a)^{(c/18a)-1.51}$$

$$alpha = f(v) = 14\left[1 - 8\left(\frac{4v - 0.5}{1+v}\right)^4\right]$$

in which: v is the Poisson's ratio of the material, namely 0.27;

E is the Young's modulus. This was measured to be 300 GPa for a material containing 42% zirconia and 350 GPa for a material containing 25% zirconia (values actually measured), and between these two fixed points a law of variation, proportional to the zirconia content, was applied to the examples mentioned;

H is the uniform hardness of the material, at one pressure, estimated in the conventional manner from the size of the indentation, but for lower loads in order to prevent the material from cracking. A nano-indentation apparatus, fitted with a Berkowich tip with a 50 g load and a descent speed for a given load of 10 mN/s, was employed. The same coating as for the toughness measurement was used;

a is the indentation size (the mean of the half-diagonals);

c is the mean crack length, starting from the center of the indentation.

For both these tests on grits, the products were calcined beforehand so as to take into account their processing and/or operating conditions. The calcining cycle chosen was a 20° C./900° C./20° C. temperature step in air with a 4 h hold at 900° C.

C) Another Procedure was Used to Evaluate the Mechanical Quality of the Grit/Vitrified Wheel Binder Interface.

We therefore formed the grits with a conventional silicate binder, using the methods known to those skilled in the art (firing at 900° C.). Small bars were produced, the modulus of rupture (MOR) of which were measured in three-point bending, using the formula: MOR (in MPa)=$3FL/2t^2w$ where:

F=force in Newtons;

L=length between the lower rollers in mm;

t=thickness of the test piece in mm;

w=width of the test piece in mm.

Low MOR values are manifested by a tendency to exhibit fracture and friability and result in poor behavior in use, or even in the wheel exploding (safety aspect).

Finally, it was necessary to define an on-grit porosity criterion suitable for the grit sizes in question and at the desired porosity levels.

I—Preparation of the Grits for the Test:

1—Screening of the fraction to be tested:

710–850 μm, to represent grit of F24 grit number;

250–300 μm, to represent grit of F60 grit number;

106–180 μm, to represent grit of F100 grit number.

This screening operation was performed on a standard LABO-MODERNE screener.

2—Removal of iron from the specimen before the test.

3—Oven-drying of the specimen at 150° C. for 15 minutes and cooling in a desiccator.

4—Coating 1 gram of grit with ARALDITE resin using the Buehler PNEUMET 3 coater.

5—Polishing of the coatings on a felt buff on which were deposited a 1 μm PRESI MECAPREX D. E. diamond paste and D.E. ROUGE diluant for the diamond paste. The polishing had to be gentle and lasted about two hours. The procedure was carried out in steps of about 15–20 minutes, so as to allow the stresses exerted on the grit particles to relax. The polishing was optionally finished with ¼ μm PRESI MECAPREX D. E. diamond paste so as to remove the final scratches. This extremely fine polishing method was aimed at minimizing the tearing effects which could be confused with porosity.

6—Placing the polished specimen in a BIOBLOCK 88155 ultrasonic bath for about ten minutes.

II—Equipment Used for the Measurement:

REICHERT POLYVAR 2 optical microscope.

III—Counting the Pores:

1—Cleaning of the polished specimen with compressed air.

2—A polished specimen of the product to be tested in the grit size cut in question was examined under the microscope. Reflective light was chosen and the magnification of the microscope was adapted according to the grit size cut under examination (see table below).

| Grit No. | Grit size cut | Magnification |
|---|---|---|
| F24 | 710–850 μm | ×50 |
| F60 | 250–300 μm | ×100 |
| F100 | 106–180 μm | ×200 |

3—An area of study was defined using the reticule of the microscope. This area must include 10–20 grit particles. The measurement was performed on five areas of the same type per specimen.

4—the number of pores and the number of grit particles per area were accounted, using the criteria allowing any tearing due to polishing to be eliminated (the details of the criteria are in the table below).

| | |
|---|---|
| 1- | only the pores for which the diameter of the circumscribed circle is greater than 20 μm are taken into account; we consider in fact that it is only these which play a significant role in the mechanical weakening of the grits. |
| 2- | of the pores of diameter between 20 and 50 μm, only those which are perfectly spherical are counted. |
| 3- | if the spherical pores form a line or a curve, they are rejected as being due to tearing during polishing. |
| 4- | if the spherical pores lie at the boundary between two phases (eutectic/primary alumina), then they are regarded as due to tearing. |
| 5- | for pores greater than 50 μm, a less precise form factor is assigned; any well-defined shape ranging from a sphere to an ovoid is regarded as a pore. Pores greater than 50 μm are usually subject to tearing, but remain sufficiently uniform for them not to be confused with tearing pure and simple. This is why greater flexibility is required with regard to these pores. |

IV—Estimation of the Grit Porosity:

The porosity was estimated by the ratio of the number of pores to the number of grit particles. The number of pores and the number of grit particles were obtained by summation over all the areas of the specimen. The porosity value is expressed as the number of pores per grit particle. The reproducibility studies carried out gave a measurement accuracy of 5%.

This procedure lent itself well to an image analysis method.

We firstly studied the thermal resistance of the reduced products. Examples 1, 2, 3 and 4 and the control product were heated at 900° C. for four hours in air, simulating the influence on the same ceramic grit of the firing of a wheel by calcining with a similar temperature profile. The production temperatures were a fortiori higher in the case of refractory components with a sintered aluminum matrix. We then tested, under the same conditions, the impact strength and the toughness by indenting the products after this oxidizing heat treatment, and in grits of F24, F60 and F100 grit numbers. Table 2 gives the results obtained.

TABLE 2

| Example No. | 1* | 2* | 3* | 4* | Control |
|---|---|---|---|---|---|
| C (ppm) | 180 | 145 | 200 | 220 | — |
| $H_2$ ($cm^3$/100 g) | 82 | 48 | 73 | 60 | — |
| | | After calcining | | | |
| Impact test, F24 (% refuse) | 0.1 | 28 | 9 | 8 | 50 |
| Impact test, F60 (% refuse) | 15 | 35 | 45 | 45 | 71 |
| Impact test, F100 (% refuse) | 38 | 37 | 42 | 54 | 75 |
| Indentation toughness ($MPa \cdot m^{1/2}$) | multiple cracking | multiple cracking | multiple cracking | multiple cracking | 2.7 |

It may be seen that the heat treatment, in all cases, clearly destroys the advantages of the alumina-zirconia-based products compared with the control, whether in terms of toughness or mechanical resistance to the impacting test. This is because an yttriated grit of the type in Example 2 gave, before calcining, values greater than 70% in the impacting test for F24, F60 and F100 grit sizes; in addition, its toughness was greater than 4 $MPa.m^{1/2}$. By comparison with the results obtained on the control grit, we chose to discard any grit for which the impact resistance was less than 40% in grit of F24 grit number, less than 50% in grit of F60 grit number and less than 60% in grit of F100 grit number. In the case of the toughness, we settled on 2.5 $MPa.m^{1/2}$ as the threshold value, below which not even the toughness of a top-of-the-range fused corundum grit was obtained.

We demonstrated that there is a relationship between reduced state and incompatibility with a vitreous binder. We measured the relative difference between the MOR of a bar of the control product and that of products produced under reducing conditions, both bars being obtained in each case simultaneously (see Table 3). The control bar had a relative density of about 2.05 and the bar of the alumina-zirconia product was made so as to have the same volume fraction of grits of F60 grit number. The two bars were then formed under the same pressing and firing conditions, with the same amounts of binder.

TABLE 3

| Example No. | 1* | 2* | 3* | 4* | Control |
|---|---|---|---|---|---|
| Carbon (ppm) | 180 | 145 | 200 | 220 | — |
| $H_2$ ($cm^3$/100 g) | 82 | 48 | 73 | 60 | — |
| Relative difference in MOR (with respect to the control) | −36% | −24% | −21% | −33% | 0% |

All these examples had MOR values significantly lower than the control (a drop of more than 20%). Firing the bars had the effect of making the reduced grits react strongly with the silicate binder (bubbling phenomenon) and of affecting the reduced species contained in the grits. Direct examination of the fracture surfaces of the bars showed that the bubbling effect was largely responsible for the weakening of the bond.

The bars obtained were thus significantly weaker, which corresponds in the application to at least premature wear of the wheel (loosening of the grit particles) or indeed to significant departures from the desired density specifications (swelling).

Thus, the vitrified, in-mold fired, reduced alumina-zirconia grits suffered from mechanical degradation (solely due to the heat treatment) together with the effect of bubbling at the binder interface.

Similarly, producing refractory components with a tabular alumina matrix from the alumina-zirconia grits of Examples 1 and 2 (F24 grit size and representing 15% of the mass of the bars before firing) resulted in unacceptable cracking and low mechanical strength. This result was clearly ascribable to a very pronounced reoxidation during the firing cycle above 600° C., as dilatometric studies show (typically with 1.5% abrupt volume expansion).

We also studied the behavior of grits obtained by oxidation of the molten liquid corresponding to Examples 9, 10, 11 and 12. These grits had a carbon content of less than 100 ppm and very low contents of reduced species (within the context of the acid etch test). However, all these materials had a high degree of porosity, not only on product chips, as cast in the manner preferred by those skilled in the art, but also on the grits themselves: Table 4 gives the porosity figures measured using the method described below for grits of F24, F60 and F100 grit numbers, and more specifically on [710–850 μm], [250–300 μm] and [106–180 μm] grit size cuts, respectively.

TABLE 4

| Example No. | 9* | 10* | 11* | 12* |
|---|---|---|---|---|
| Carbon (ppm) | 40 | 20 | 30 | 45 |
| $H_2$ ($cm^3$/100 g) | 16 | 14 | 14 | 7 |
| Porosity (number of pores >20 μm/grit), F24 grit | 6.2 | 11.7 | 7.2 | 6.2 |
| Porosity (number of pores >20 μm/grit), F60 grit | 2.1 | 2.8 | 2.6 | 3.2 |
| Porosity (number of pores >20 μm/grit), F100 grit | 1.1 | 1.1 | 1.1 | 1.3 |

We saw in the introduction that the literature indicates that products produced under more oxidizing conditions gave less favorable results than reduced products for applications involving wheels with organic binders and coated abrasives (we found that, in the impact test, the product 10* gave 37 and the product 11* gave 45). It is probable that the oxidation plays an unfavorable role by lessening the stabilization of the zirconia in tetragonal form and by obtaining less fine interlamellar or inter-fiber spaces in the eutectic colonies. However, we believe that the lower mechanical performance of products oxidized during melt processing is due essentially to their porosity. This is because each pore should be considered as an area of grit embrittlement and stress concentration, which area may initiate fractures. Without wishing to be tied to any one theory, it is probable that oxidizing production results in a higher incorporation of gas and, consequently, to greater gas evolution (and greater porosity) upon solidification. It is apparent in fact from Table 4 that the products produced under oxidizing melting conditions tend to have a high porosity, substantially over at least the range of grit numbers considered. To avoid the problems due to this porosity and encountered in application, we chose to discard grits having a porosity of greater than 6 in the case of grit of F24 grit number, greater than 2 in the case of grit of F60 grit number and greater than 1 in the case of grit of F100 grit number (the results being expressed as a number of pores of circumscribed diameter greater than 20 μm per grit particle).

As in the previous tests, we treated all grits according to the invention at 900° C. for four hours before testing their toughness and their resistance to the impacting test. All the results are given in Table 5.

TABLE 5

| Example No. | 5 | 6 | 7 | 8 | Control |
|---|---|---|---|---|---|
| Carbon (ppm) | 60 | 45 | 95 | 50 | — |
| H$_2$ (cm$^3$/100 g) | 30 | 21 | 44 | 26 | — |
| Porosity (number of pores >20 μm/grit), F24 grit | 1.1 | 5 | 2.5 | 2.3 | — |
| Porosity (number of pores >20 μm/grit), F60 grit | 1.5 | 0.5 | 1.7 | 0.7 | — |
| Porosity (number of pores >20 μm/grit), F100 grit | 0.2 | 0.5 | 0.9 | 0.8 | — |
| After calcining | | | | | |
| Impact test, F24 (% refuse) | 58 | 57 | 66 | 57 | 50 |
| Impact test, F60 (% refuse) | 68 | 57 | 78 | 77 | 71 |
| Impact test, F100 (% refuse) | 60 | 67 | 63 | 62 | 75 |
| Indentation toughness (MPa · m$^{1/2}$) | 4.0 | 4.2 | 4.3 | 4.1 | 2.7 |

The performance of the grits according to the invention was at least comparable with, and often better than, the control product by clearly benefiting from the better toughness properties of the alumina-zirconia materials. The structure of the products of the invention containing about 42% zirconia remained close to a well-formed eutectic with, within the eutectic colonies, an interlamellar space between the zirconia and the fine alumina, and grain boundaries developed to a greater or lesser extent according to the content of stabilizing additives and of impurities. The products of the invention clearly have the required density characteristics. The porosity study made it possible to check that a high proportion (at least 25%, but typically 90% in the examples cited) of the grits of the invention had no microcracks after calcining. Microcrack should be understood to mean a crack having a length of greater than 30 μm and a width of greater than 3 μm. This measurement was made using an optical microscope on the same polished specimens as those used for evaluating the porosity.

The stabilizers gave, for the grits of Examples No. 6, 7 and 8 respectively, the following monoclinic zirconia contents: 5%, 46% and 50% (as opposed to 54% in the case of Example No. 5 without a stabilizer). These values are close to those obtained on "conventional" reduced products which gave 0% in the case of Example 2 and 51% in the case of the example without stabilizer, respectively.

These values were obtained by an X-ray diffraction method, by directly analyzing polished specimens on randomly oriented grits (in this case, F24 grit), and therefore excluding the effect of zirconia destabilization due to powder milling (as is the case with conventional methods). Next, the ratio of the areas under the two monoclinic zirconia peaks (at low angles, namely 2θ=28.4° and 31.4°) to the sum of the areas under the three zirconia peaks (the abovementioned two peaks and the peak at 2θ=30.3° corresponding to stabilized zirconia) were determined in a conventional manner. The latter peak was interpreted as being due to stabilized zirconia in the tetragonal form, but this would not exclude certain products of the invention from containing stabilized zirconia in cubic form. Differentiation could be achieved by examining the X-ray diffraction spectrum at high angles, and we have detected no cubic form in the specimens considered here. The monoclinic zirconia content is given by the formula: (Am1+Am2)/(Am1+Am2+0.8×At), where Am1 and Am2 denote the areas under the peaks corresponding to the monoclinic phase and At denotes the area under the peak corresponding to the stabilized phase.

The beneficial effect in abrasive applications of the zirconia stabilization is well documented (cf. U.S. Pat. No. 4,457,767 and DE-C-4 306 966); this effect is just as desirable for refractory applications, for which it is a significant advantage for there to be minimal transformation of the zirconia (and therefore minimal contractions and expansions) during thermal cycling. These facts have lead us to prefer yttria-stabilized embodiments of the invention, and to a lesser extent those stabilized by titanium oxide.

The grits of the invention are also thermally stable. This property therefore makes them suitable for forming with oxide-based binders, such as the vitreous binders for wheels or the oxide matrices for white refractories. Bars with a vitreous binder, produced using yttria-stabilized grits of the invention (Example 6) and those stabilized by titanium oxide (Example 7) gave modulus of rupture values which were only 19% and 14% less than that of the control, respectively. This slight tendency to lower values with respect to the control is due, of course, to the presence of zirconia, which naturally has the effect of reducing the modulus of rupture value (without this being prejudicial within the limits mentioned). The values on the products claimed in all cases remain very acceptable; the bubbling effects as observed on fracture surfaces were, however, minimal.

Circular wheels were also produced, these giving, as such, wear rates (with a given rate of removal of material) very much lower than the control grit (longevity of the new wheel), as shown by the results of tests carried out using a wheel of hardness I$_8$ by machining an AISI standard 52100 steel, typically used for machining the cages of ball bearings.

With constant force (given in brackets in N/mm of wheel width), the measured wear rates were:

| Wear rate for grits according to the invention (mm$^3$/mm/s) | Wear rate for control grits (mm$^3$/mm/s) |
|---|---|
| 0.044 (16.1) | 0.126 (17.0) |
| 0.091 (18.4) | 0.250 (18.3) |
| 0.187 (20.4) | 0.516 (20.6) |

We have therefore essentially adopted the value of 100 ppm of carbon as being the limit below which the grits are compatible with the binders of vitrified wheels. The content of reduced species, as indicated by the acid etch test, gives an additional indicator: the low hydrogen level is an additional guarantee of very low reactivity with vitreous binders.

As regards refractory applications, the manufacture of bars made of grits of Example 6 in a matrix of tabular alumina gave good mechanical behavior and a much more uniform thermal expansion curve (no oxidation peak), unlike the conventional products. Moreover, the low openporosity and cracking of the grits of the invention give them good corrosion resistance for iron and steel applications.

EXAMPLES 13–23

Products Containing About 25% Zirconia

For these examples, the same production methods and the same tests as those described with regard to Example 1–12 were used.

All the chemical and oxidation-reduction analysis data is given in Table 6.

TABLE 6

| Examples | 13* | 14* | 15* | 16* |
|---|---|---|---|---|
| Nature of the product | Reduced, with no addition | Reduced, with $Y_2O_3$ addition | Reduced, with $TiO_2$ addition | Reduced, with MgO addition |
| $ZrO_2$ (wt %) | 24.5 | 27.4 | 26.2 | 24.6 |
| $SiO_2$ (wt %) | 0.15 | 0.14 | 0.16 | 0.16 |
| $Na_2O$ (wt %) | 0.11 | 0.09 | <0.05 | 0.14 |
| $Y_2O_3$ (wt %) | / | 0.49 | / | / |
| $TiO_2$ (wt %) | / | / | 1.81 | / |
| MgO (wt %) | / | / | / | 1.05 |
| $Al_2O_3$ (wt) | balance | balance | Balance | balance |
| Carbon (ppm) | 250 | 180 | 260 | 200 |
| $H_2$ (cm³/100 g) | 85 | 81 | 72 | 56 |
| Indentation toughness after calcining (900° C./4 h) (MPa · m$^{1/2}$) | multiple cracking | 2.1 | multiple cracking | 2.1 |

| Examples | 17 | 18 | 19 |
|---|---|---|---|
| Nature of product | According to the invention, with no addition | According to the invention, with $Y_2O_3$ addition | According to the invention, with $TiO_2$ addition |
| $ZrO_2$ (wt %) | 29.7 | 33.6 | 27.1 |
| $SiO_2$ (wt %) | 0.19 | 0.17 | 0.53 |
| $Na_2O$ (wt %) | 0.15 | 0.07 | 0.08 |
| $Y_2O_3$ (wt %) | / | 0.52 | / |
| $TiO_2$ (wt %) | / | / | 1.42 |
| MgO (wt %) | / | / | / |
| $Al_2O_3$ (wt %) | balance | balance | balance |
| Carbon (ppm) | 65 | 35 | 65 |
| $H_2$ (cm³/100 g) | 5 | 14 | 38 |
| Indentation toughness after calcining (900° C./4 h) (MPa.m$^{1/2}$) | 3.3 | 3.6 | 3.6 |
| Porosity (number of pores >20 µm/grit), F24 grit | 2.1 | 3.7 | 2.1 |
| Porosity (number of pores >20 µm/grit), P60 grit | 1.8 | 1.1 | 1.1 |
| Porosity (number of pores >20 µm/grit), F100 grit | 0.5 | 0.6 | 0.7 |

| Examples | 20* | 21* | 22* | 23* |
|---|---|---|---|---|
| Nature of product | Porous, with no addition | Porous, with $Y_2O_3$ addition | Porous, with $TiO_2$ addition | Porous, with MgO addition |
| $ZrO_2$ (wt %) | 31.3 | 29.7 | 28.1 | 23.7 |
| $SiO_2$ (wt %) | 0.23 | 0.21 | 0.96 | 0.22 |
| $Na_2O$ (wt %) | 0.14 | 0.12 | 0.15 | 0.22 |
| $Y_2O_3$ (wt %) | / | 0.5 | 0.25 | / |
| $TiO_2$ (wt %) | / | / | 1.07 | / |
| MgO (wt %) | / | / | / | 1.08 |
| $A_2O_3$ (wt %) | balance | balance | balance | balance |
| Carbon (ppm) | 40 | 35 | 40 | 75 |
| $H_2$ (cm³/100 g) | 1 | 9 | 3 | 8 |
| Porosity (number of pores >20 µm/grit), F24 grit | 6.2 | 6.2 | 8.6 | 7.0 |

*: example outside the invention.

Comment with Regard to the Test to Determine the Toughness By Indentation:

In the case of products containing about 25% zirconia, the structure no longer being simply composed of eutectic colonies, it was preferred to indent in regions in which the structures are the finest, that is to say the regions that are the first to solidify (shell region) where solidification did not dissociate primary corundum areas from eutectic colonies. It was those regions which in fact gave the best toughness values. The spread in toughness after calcining between reduced products and products of the invention was even more pronounced outside this shell region, where the eutectic cells formed and the reduced species concentrated.

We have therefore found a novel type of alumina-zirconia fused grit, which is
- dense (and therefore mechanically strong since it benefits from the intrinsic toughness of the alumina-zirconia materials);
- not very sensitive to oxidation (i.e. thermally stable), independently of whether or not the grits contain a zirconia stabilizer.

These properties destine the product of the invention particularly to used as abrasive tools. The tools are produced using the fused alumina-zirconia grits according to the invention and bonding by a binder, or the depositing as a layer on a flexible support and retaining by a binder. These said abrasive tools are formed into abrasive grit (in particular in wheels with a vitreous mineral binder) or as refractory grit (in applications in which oxidation resistance is desirable, particularly in sintered white refractories). The grits of the invention thus allow these applications to benefit from the advantages of zirconia-alumina grits, especially their high toughness and their wear and corrosion resistance.

The fused alumina-zirconia grits according to the invention can be incorporated into a matrix, preferably an oxide-based matrix.

Refractory components produced by a process according to the invention can be used in the continuous casting of steel, particularly as slide gate valve plates.

Although the invention has been described in connection with various embodiments, it is evident that it is in no way thereby limited and that it comprises all technical equivalents and their combinations encompassed by the appended claims.

The invention claimed is:

1. A process for producing fused alumina-zirconia grits comprising the steps of:
   a) mixing raw materials to produce grits with the following chemical composition, in % by weight:

| | |
|---|---|
| $ZrO_2 + HfO_2$: | 10–60% |
| $Al_2O_3$: | 38–90% |
| $SiO_2$: | <0.8% |
| Impurities: | <1.2% | b) adding carbon and aluminum metal to the mixture of raw materials to obtain a charged batch containing, in % by weight,:

| | |
|---|---|
| Carbon: | 0.4–1% |
| Aluminum metal: | 0.5–2.5% | c) melting said charged batch in an electric arc furnace with a voltage of 175–205 V and a delivered specific electrical energy of 2.5 to 4 kWh per kg of charge.

2. A process for producing fused alumina-zirconia grits according to claim 1, wherein said delivered specific electrical energy is 2.7–3.3 kWh per kg of charge.

3. A process for producing fused alumina-zirconia grits according to claim 1, wherein said carbon is coke, pet coke, coal, or a mixture of these materials.

4. A process for producing fused alumina-zirconia grits according to claim 1, wherein said carbon content is 0.7–0.9%.

5. A process for producing fused alumina-zirconia grits according to claim 1, wherein said aluminum metal content is 2.4–2.5%.

6. A process for producing fused alumina-zirconia grits according to claim 1, further comprising the following step d) after step c):

d) quenching said melted charged batch of step c).

7. A process for producing fused alumina-zirconia grits according to claim 6, further comprising the following steps e) and f) after step d):

e) milling said quenched charged batch of step d) into grits, f) calcining said grits at a temperature between 800° C. and 1100° C. for a time between 2 to 8 hours.

8. A process for producing fused alumina-zirconia grits according to claim 7, wherein said calcining is operated at 850–950° C., for 3–5 hours.

9. A process for producing fused alumina-zirconia grits according to claim 7, wherein, before step f), said grits are screened and grits of grit numbers from F12 to F120 (FEPA "F" standard) are selected.

10. A process for producing fused alumina-zirconia grits according to claim 1, wherein, at step a), said mixture of raw materials produces grits further containing up to 10% by weight of at least one of the following oxides: yttrium oxide, titanium oxide and magnesium oxide, the content of $Al_2O_3$ being reduced accordingly.

11. A process for producing fused alumina-zirconia grits according to claim 1, wherein, at step a), said mixture of raw materials produces grits further containing up to 3% by weight of at least one of the following oxides: yttrium oxide, titanium oxide and magnesium oxide, the content of $Al_2O_3$ being reduced accordingly.

12. A process for producing fused alumina-zirconia grits according to claim 1, wherein, at step a), $ZrO_2+HfO_2$ represent from 35 to 50% by weight and $Al_2O_3$ represents from 48 to 65% by weight.

13. A process for producing fused alumina-zirconia grits according to claim 1, wherein, at step a), $ZrO_2+HfO_2$ represent 38–45% by weight.

14. A process for producing fused alumina-zirconia grits according to claim 1, wherein, at step a), $SiO_2$ represents <0.4% by weight.

15. A process for producing fused alumina-zirconia grits according to claim 1, wherein, at step a), said mixture of raw materials produces grits further containing at least one of yttrium oxide in an amount from 0.3 to 2% by weight and titanium oxide in an amount from 1 to 3% by weight and magnesium oxide in an amount from 1 to 2% by weight, the content of $Al_2O_3$ being reduced accordingly.

16. A process for producing abrasive tools comprising the production of fused alumina-zirconia grits according to a process according to claim 1 and further comprising one of the steps of bonding the grits by a binder; and depositing the grits as a layer on a flexible support and then retaining the grits by a binder.

17. A process according to claim 16, wherein said abrasive tools are formed into wheels, and said binder is a vitreous mineral binder.

18. A process for producing refractory components comprising a) the production of fused alumina-zirconia grits according to a process according to claim 1 and b) the incorporation of said grits into a matrix.

19. A process for producing refractory components according to claim 18, wherein said matrix is an oxide-based matrix.

* * * * *